United States Patent
Hostetler

Patent Number: 5,327,853
Date of Patent: Jul. 12, 1994

[54] ENCAPSULATED DRINKER

[75] Inventor: Eldon Hostetler, Middlebury, Ind.

[73] Assignee: Ziggity Systems, Inc., Middlebury, Ind.

[21] Appl. No.: 994,638

[22] Filed: Dec. 22, 1992

[51] Int. Cl.$^5$ .................... A01K 7/00; A01K 39/02
[52] U.S. Cl. .................... 119/72.5; 251/339
[58] Field of Search .............. 119/72, 72.5; 251/218, 251/228, 291, 339, 367

[56] References Cited

U.S. PATENT DOCUMENTS

| | | | |
|---|---|---|---|
| 3,416,499 | 6/1967 | Wilmot | 119/72.5 |
| 3,527,193 | 8/1970 | Smith | 119/72.5 |
| 4,133,345 | 1/1979 | Mitchell | 251/339 X |
| 4,284,036 | 8/1981 | Hostetler | 119/72.5 |
| 4,370,948 | 2/1983 | Atkins | 119/72.5 |
| 4,512,551 | 4/1985 | Dalferth | 251/339 |
| 4,516,533 | 5/1985 | Mallinson | 119/72 |
| 4,524,724 | 6/1985 | Steudler, Jr. | 119/72.5 |
| 4,589,373 | 5/1986 | Hostetler et al. | 119/72.5 |

FOREIGN PATENT DOCUMENTS

| | | |
|---|---|---|
| 0332852 | 2/1989 | European Pat. Off. . |
| 641507 | 8/1950 | United Kingdom ........ 119/72.5 |
| 699538 | 11/1953 | United Kingdom . |
| 1152819 | 5/1969 | United Kingdom . |
| 1288134 | 9/1970 | United Kingdom . |
| 1321644 | 6/1973 | United Kingdom . |
| 1536662 | 9/1974 | United Kingdom . |

OTHER PUBLICATIONS

Hart H-20X Brochure.
Hart C-30XL Brochure.

Primary Examiner—Robert P. Swiatek
Attorney, Agent, or Firm—Barnes & Thornburg

[57] ABSTRACT

A nipple-type drinker for fowl and small animals with a self-contained valve assembly that can be inserted in and removed from the drinker as a single unit is disclosed. The drinker includes a valve chamber with a metering pin, valve member, and valve seat therein. The valve seat is a metal, annular member that is press-fit into the valve chamber. When the seat is positioned in the chamber it prevents the metering pin and valve member from falling out. Thus, a self-contained valve assembly is provided. The valve assembly is telescopically mated with a housing as a single unit. The housing includes a trigger pin and an outlet for fluid. The housing further includes a stop that works in conjunction with a lip in the valve chamber to align the valve seat when the drinker is assembled.

18 Claims, 5 Drawing Sheets

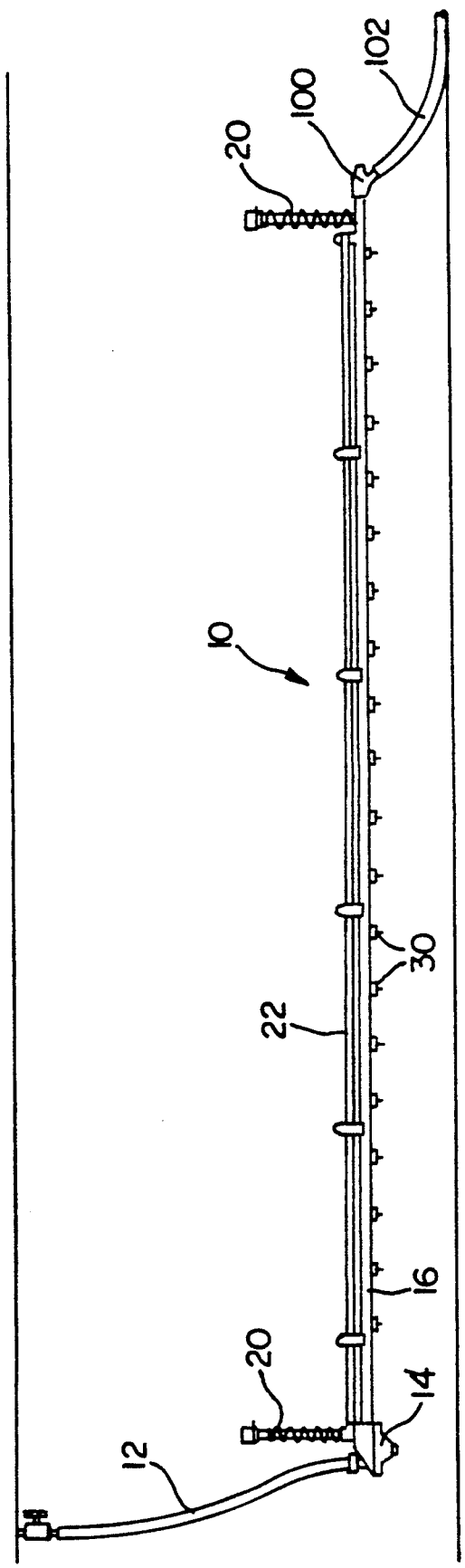

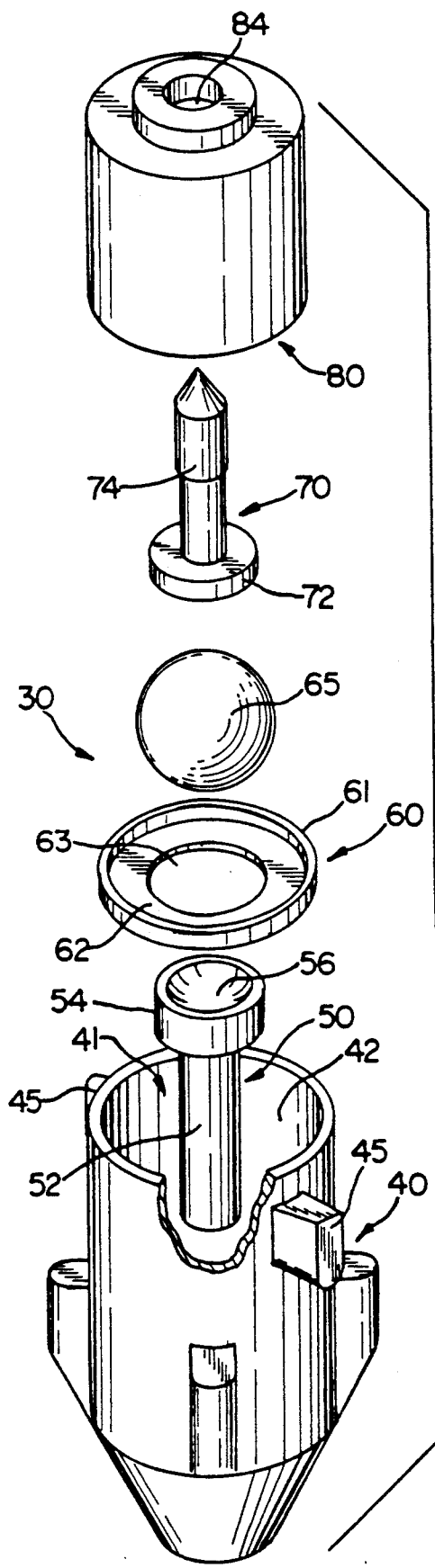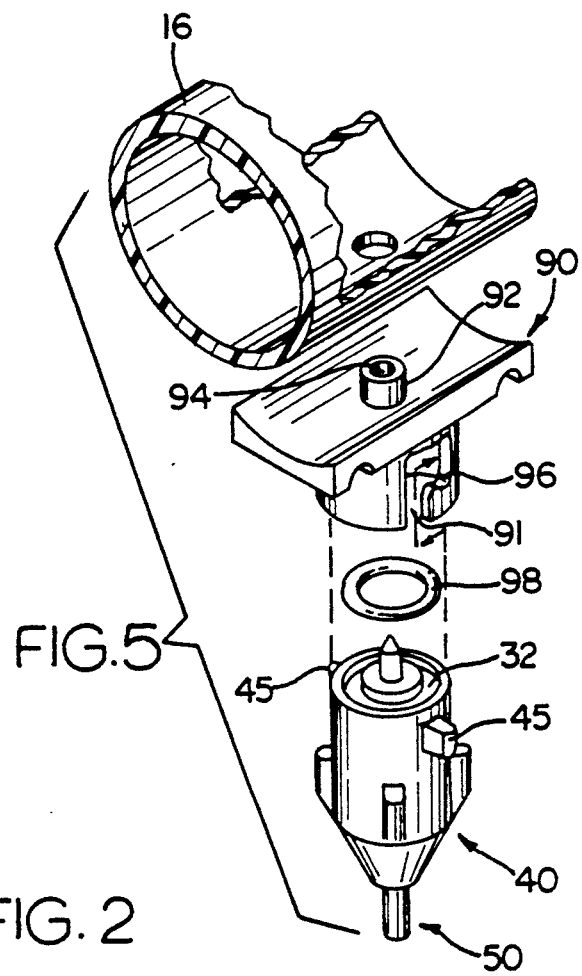

ENCAPSULATED DRINKER

BACKGROUND AND SUMMARY OF THE INVENTION

The present invention relates generally to watering systems for poultry and small animals, and more particularly, to an improved nipple drinker for such a watering system.

Over the years numerous nipple drinker watering systems have been attempted. Some of the most widely used nipple drinker watering systems are currently manufactured by Ziggity Systems, Inc. of Middlebury, Ind. These watering systems involve the use of several branching water supply lines extending the length of a poultry house interior. Numerous nipple drinkers are attached to the water supply lines so that the poultry may obtain water by pecking at the nipple.

Several types of nipple drinkers have been produced. One such drinker is shown in U.S. Pat. No. 4,637,345, issued to the present inventor. The '345 drinker includes a valve chamber divided into upper and lower sections. The lower section includes a valve seat, which supports a trigger pin, and a spherical valve member for controlling fluid flow from the top portion of the chamber to the outlet. Commercial embodiments often utilize a rubberized material for the valve seat. The '345 drinker has been found to perform exceptionally well under most conditions. However, it has certain limitations when exposed to harsh environments for an extended period of time. Such environments may be found where large amounts of chemicals and impurities are found or used in the water supply. Similarly, over-medication of the water supply by the producer may present an unfavorable environment. Under such conditions for an extended period of time, the rubberized valve seat may begin to deteriorate and/or lose flexibility. When this happens, the valve member may not make a tight seal, and water may leak out of the drinker, thereby wetting the manure pits and nesting material found in poultry houses. This wetting increases the opportunity for bacteria and disease in the poultry house.

Accordingly, nipple drinkers have been manufactured with metal seats. One such drinker is shown in U.S. Pat. No. 4,524,724. In this drinker, the valve seat consists of a relatively thick, machined metal insert. It has been found that such metal seats are also subject to deterioration in the presence of certain chemicals. Furthermore, the large amount of material used for the seat and the cost of machining significantly increase the cost of the drinker.

Other metal seats include simple washers, such as the one shown in U.K. Patent No. 1,2.88,134. It has been found advantageous to coin such seats so as to provide a better seal. However, it has also been found that coining such washer seats can sometimes cause the seat to warp or otherwise deform, thereby degrading the quality of the seal.

Accordingly, it is sometimes necessary to replace the valve seat, whether it is made of rubber or metal. The valve seat in the '345 device is readily replaceable by disassembling the drinker, prying the seat out of the lower section of the valve chamber, and inserting a replacement seat. With regard to the '724 device, the seat is not intended to be replaceable, and therefore, the entire drinker is replaced when the seat fails. Furthermore, if any of the above-mentioned drinkers is disassembled for cleaning or other reasons, the ball or other valve means and metering pin are free to fall out of the chamber when the top and bottom portions are separated. If this happens, the parts may be lost in the straw or nesting material normally found in poultry houses.

Accordingly, it is an object of the present invention to provide an improved nipple drinker for watering fowl and small animals.

Another object of the present invention is to provide an improved valve seat for a nipple drinker that has greater wear resistance and requires less material and less expense to make than previously known seats.

Yet another object of the present invention is to provide an improved assembly for a nipple drinker that allows for easier assembly and disassembly of the drinker.

Still another object of the present invention is to provide an improved assembly for a nipple drinker in which the valve seat may be more easily replaced.

These and other objects of the present invention are attained by the provision of a nipple drinker with a self-contained valve assembly that can be inserted in and removed from the drinker as a single unit. The drinker has a valve chamber and a housing unit. The valve chamber comprises a cylindrical member with an inlet for fluid at one end and an opening at the other. A metering pin is inserted through the opening so that it projects out of the fluid inlet. A ball is then inserted through the opening in the valve chamber and is secured therein by press-fitting an annular seat in the opening of the valve chamber. Thus, the valve chamber, metering pin, ball, and valve seat form a self-contained valve assembly. The housing has an outlet for water at one end and an opening at the opposite end. The lower portion of the housing contains a seat on which the head of a valve actuating member rests. After the valve actuating member is inserted in the housing, the valve chamber unit is telescopically fitted into the opening at one end of the housing. A raised lip in the valve chamber and a stop in the housing unit provide proper alignment for the valve seat. As assembled, a portion of the ball extends below the valve seat and is located near the head of the valve actuating member.

Other objects and novel features of the present invention will become evident to those who are skilled in the art from the following detailed description of the preferred embodiments.

BRIEF DESCRIPTIONS OF THE DRAWINGS

FIG. 1 is a side-plan view of a typical poultry watering system in which the present invention may be utilized.

FIG. 2 is an exploded view of a drinker according to the present invention.

FIG. 5 is an exploded view of the mounting system for a drinker according to the present invention.

DETAILED DESCRIPTION OF THE PREFERRED EMBODIMENTS

Figure 3:
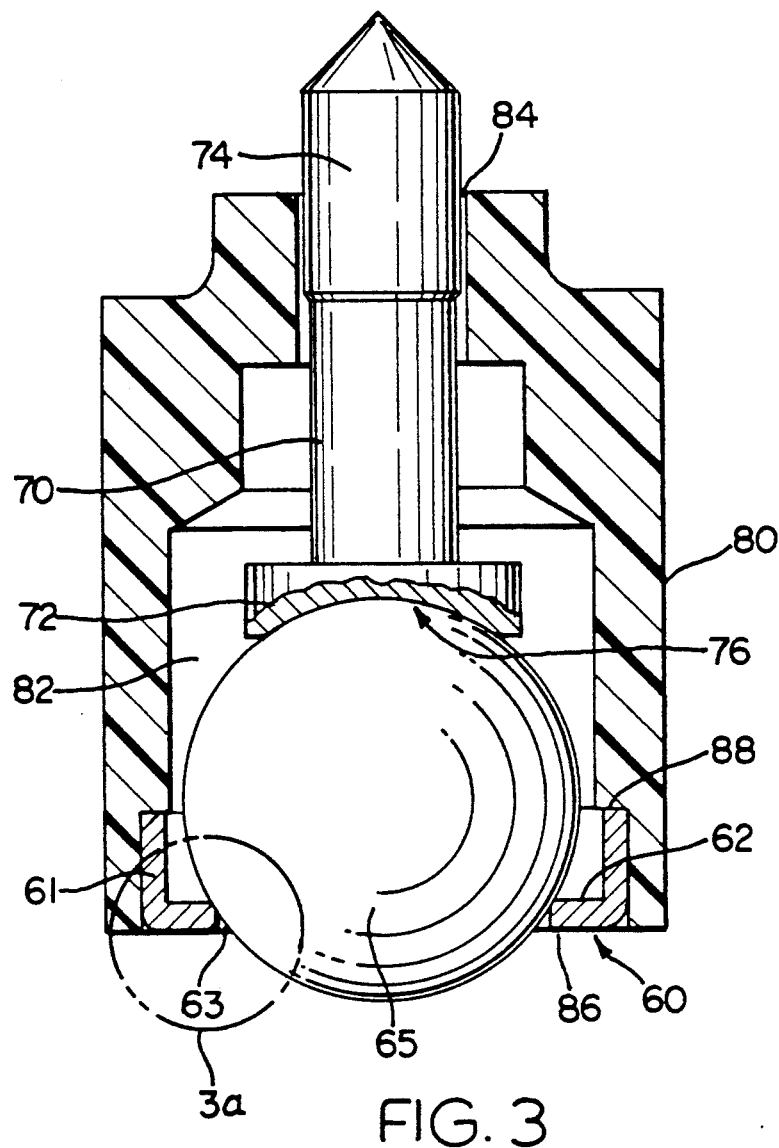
FIG. 3 is a cross-sectional view of the valve unit of a drinker according to the present invention.

FIG. 1 shows a side-plan view of a typical poultry watering system generally indicated by the number 10. Hose 12 is connected to a water supply (not shown) and leads into pressure regulator 14, which is attached to one end of supply line 16. A first stand pipe 20 is attached to pressure regulator 14, and a second stand pipe 20 is attached to supply line 16 at the opposite end of system 10. Stand pipes 20 provide a visual indication of the water pressure. Drain valve 100 and drain hose 102 are attached to one end of supply line 16 and may be used to flush system 10 if desired. Reinforcing pipe 22 is attached to supply line 16 and runs the length thereof. System 10 is supported by wires (not shown) attached to the ceiling of the poultry house and to reinforcing pipe 22. Drinkers 30 extend downward from supply line 16.

FIG. 2 shows an exploded view of a drinker 30 according to the present invention. Drinker 30 typically comprises body unit 40, trigger 50, valve seat 60, valve member 65, metering pin 70, and valve chamber 80.

Housing unit 40 has a generally cylindrical chamber 41 with an interior surface 42. Arms 45 extend outward from housing 40 and are used to attach drinker 30 to system 10 as described below. It has been found advantageous to make housing 40 out of ABS plastic. Trigger 50 includes a generally cylindrical pin 52 and an actuator head 54 disposed at one end thereof. Actuator head 54 has a depression 56 in the top surface thereof. Valve seat 60 is an annular ring made of metal with sidewall 61 and seating surface 62. Opening 63 in valve seat 60 allows water to flow downward along trigger 50 as discussed below. Valve member 65 is a sphere. Trigger 50 is preferably made from 304 stainless steel. Valve seat 60 and valve member 65 are preferably made from 302 stainless steel.

Figure 3A:
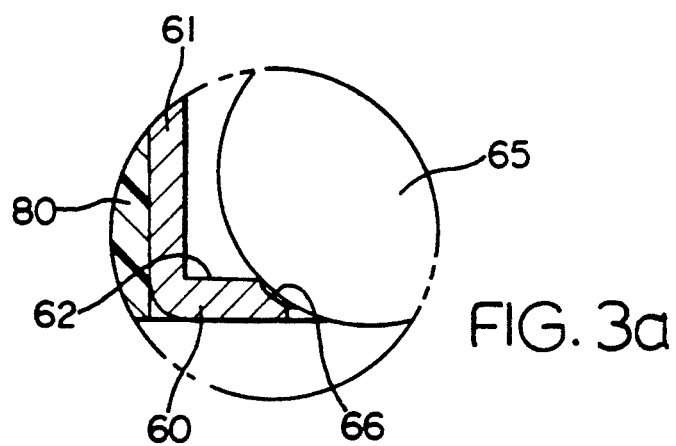
FIG. 3a is an enlarged view of the area indicated by circle 3a in FIG. 3.

FIG. 3 shows valve chamber 80, metering pin 70, valve member 65, and valve seat 60 assembled to form the valve assembly for drinker 30. Valve chamber 80 has a cavity 82 therein with an inlet 84 at one end and an opening 86 at the other. Lip 88 is an integrally formed part of valve chamber 80. It has been found advantageous to make valve chamber 80 from ABS plastic. To form the valve assembly, metering pin 70 is inserted in valve chamber 80 through opening 86 such that body portion 74 extends through inlet 84. Valve member 65 is then inserted in valve chamber 80 through opening 86. Finally, valve seat 60 is inserted in opening 86 of valve chamber 80 until sidewall 61 rests fully on lip 88. The clearance between sidewall 61 of valve seat 60 and opening 86 of valve chamber 80 are such that valve seat 60 is tightly press-fit in opening 86. Furthermore, seating surface 62 of valve seat 60 has a coined edge 66 corresponding to the curvature of valve member 65. (FIG. 3a) As assembled, valve chamber 80, valve seat 60, valve member 65 and metering pin 70 form a self-contained valve assembly.

Figure 4:
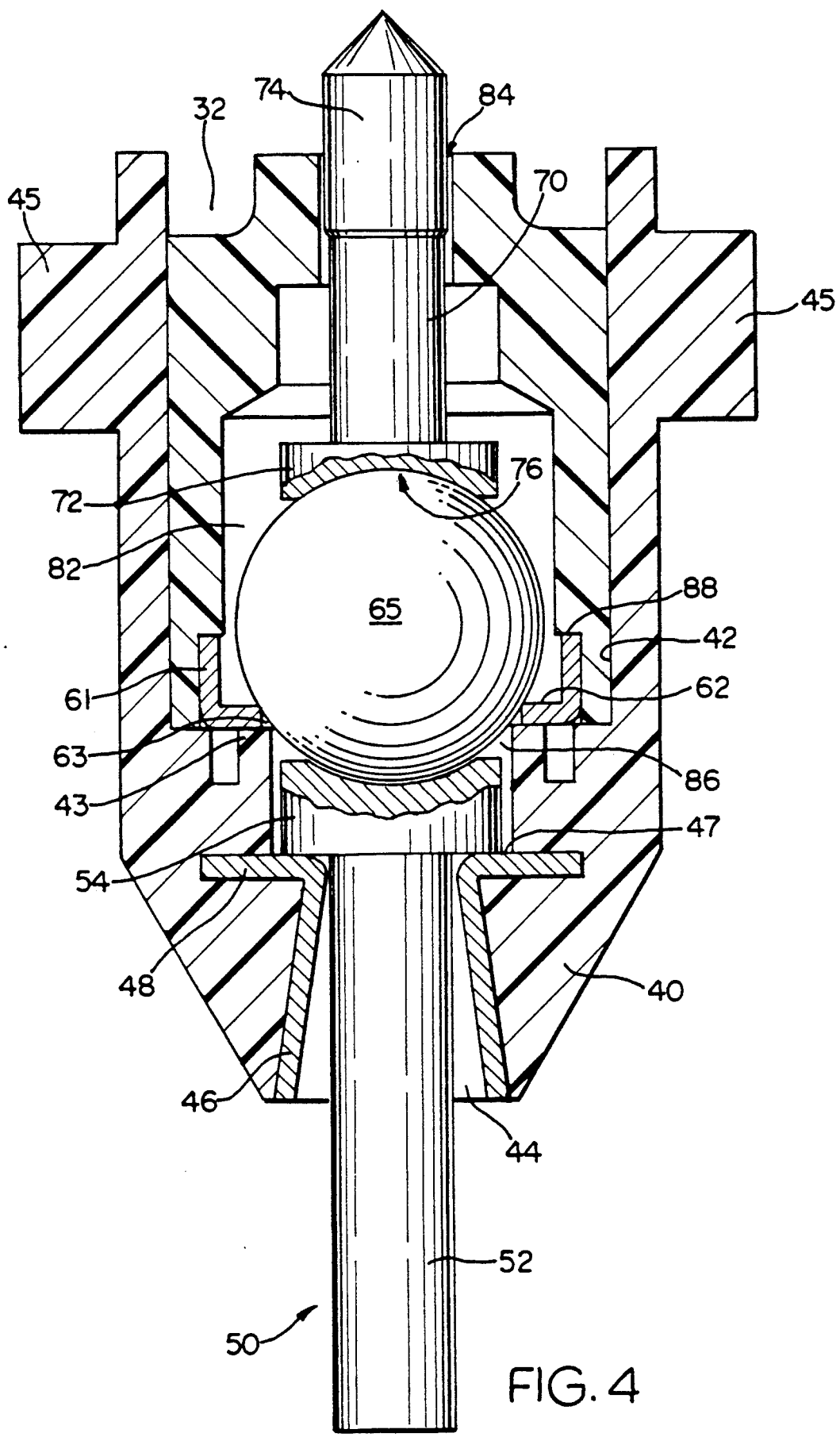
FIG. 4 is a cross-sectional view of a drinker according to the present invention.

FIG. 4 shows the relationship among the valve assembly, housing 40, and trigger 50. Housing 40 has a frusto-conical bore 44 located at one end, which provides the outlet for water as will be described below. Bore 44 is lined with a wear resistant insert 46. Insert 46 is generally frusto-conical with a flange 48, the top surface of which forms seat 47. Housing 40 is further integrally provided with an annular stop 43 that assists alignment of valve seat 60 as described below. Trigger 50 is inserted in housing 40 such that pin 52 extends through bore 44 and actuator head 54 rests on seat 47. The entire valve assembly shown in FIG. 3 is then inserted in opening 41 of housing 40 until advancement is prohibited by stop 43. In this position, stop 43 and lip 88 ensure proper alignment of valve seat 60. Valve member 65 rests on the edges of seating surface 62 of valve seat 60 and extends partially through opening 63. The portion of valve member 65 extending below valve seat 60 rests spaced apart from actuator head 54 of trigger 50.

Drinker 30 can be attached to supply line 16 as shown in FIG. 5. The attachment mechanism shown in FIG. 5 is currently sold by Ziggity Systems, Inc. as the "Twin-Hook Saddle." Element 90 is ultrasonically welded to supply line 16 such that tube 92 with opening 94 therein extends into supply line 16. O-ring 98 is then inserted in groove 32, and drinker 30 is raised such that arms 45 on housing 40 engage slot 91 in element 90. Drinker 30 is then rotated so that arms 45 are offset from slot 91 and rest on surface 96 of element 90. So mounted, water flows through opening 94 in element 90, through opening 84 in valve chamber 80, and into cavity 82 (FIG. 4). The seal formed by valve member 65 resting on valve seat 60 prevents the water from flowing out of cavity 82 in valve chamber 80. Further sealing is provided by actuator head 54 resting against seat 47.

To obtain water from drinker 30, a fowl or other small animal would peck or lift pin 52 of trigger 50. This motion of trigger 50 would cause actuator head 54 to be unseated from seat 47. Furthermore, as actuator head 54 becomes unseated it will lift valve member 65, thereby unseating it from valve seat 60. When this occurs, water is free to flow through inlet 84 into cavity 82 through opening 86 and out bore 44. When the fowl or other animal ceases actuation of pin 52, actuator head 54 will again seat on seat 47, and valve member 65 will seat on valve seat 60, thereby shutting off the flow of water.

Figure 6:
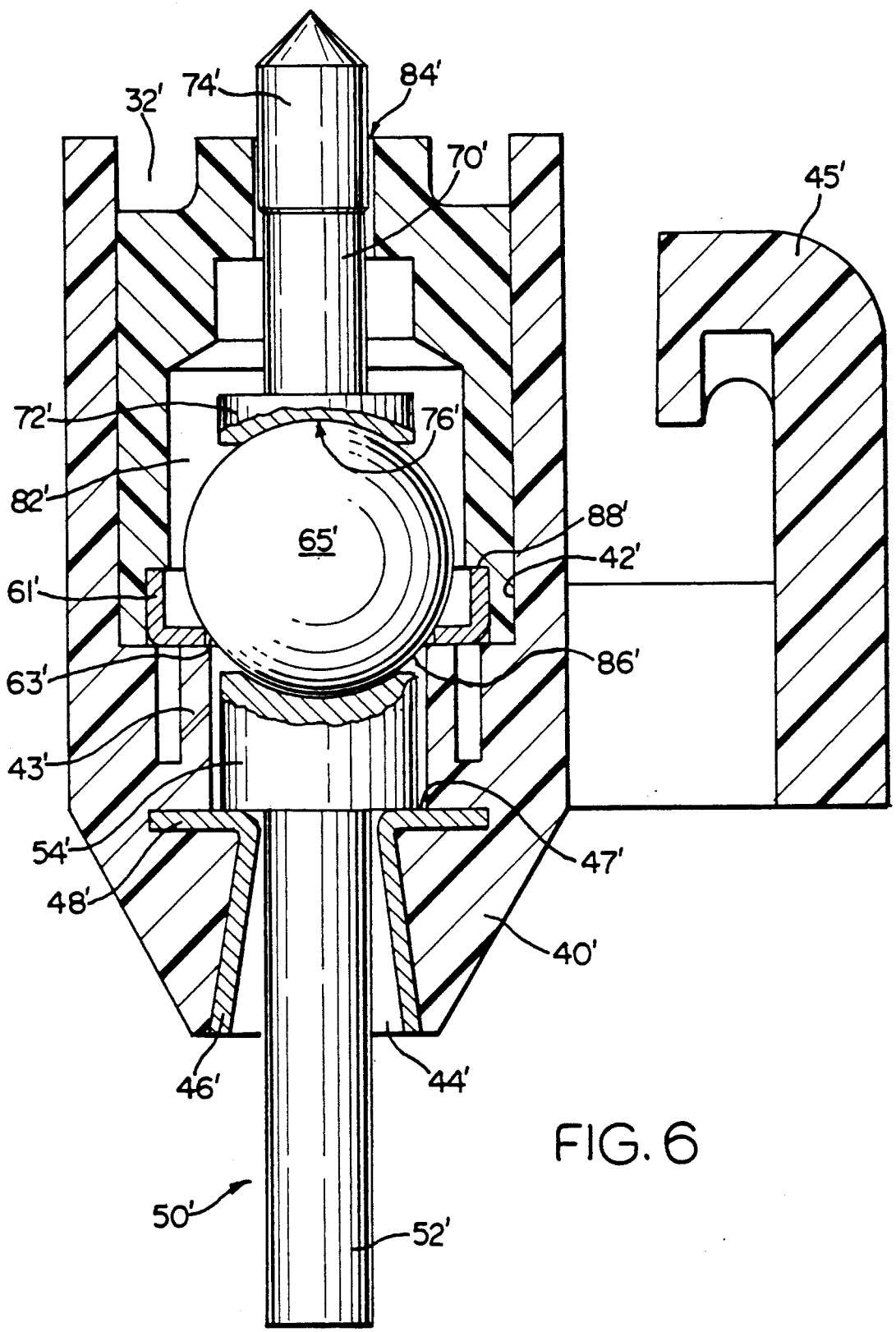
FIG. 6 is a cross-sectional view of another embodiment of a drinker according to the present invention.

From the foregoing description, it will now be obvious to those skilled in the art that various embodiments of the present invention are possible. For example, the embodiment shown in FIG. 6 utilizes a different arm 45' for mounting drinker 30'. Additionally, although seat 60 has been described as being made of metal, any material sufficient to provide an appropriate seal and appropriately resistant to wear and chemicals may be used. Furthermore, it is anticipated that a sufficiently flexible, resilient, and wear resistant material could be used to form the valve seat as an integral part of the valve chamber. To assemble such a device, the trigger pin would be inserted through the inlet in the valve seat such that the body portion extends through the inlet in the valve chamber. The valve member would then be forced through the integrally formed valve seat and into the cavity of the valve chamber. The integrally formed resilient valve seat would then snap back into place and prevent the valve member and trigger pin from falling out of the valve chamber, thus forming an integral valve unit.

Although the present invention has been described in detail, the same is by way of illustration and example only and is not to be taken by way of limitation. The spirit and scope of the invention are to be limited only by the claims appended hereto.

What is claimed is:

1. A watering device for fowl and small animals having:

a valve chamber with an inlet for receiving fluid;

a valve member disposed in said chamber for controlling fluid flow therethrough;

a valve seat disposed in said chamber;

a housing with an outlet for passing fluid to said fowl and small animals; and said valve chamber, valve member and valve seat forming a self-contained valve assembly that mates with said housing as a single unit.

2. The watering device according to claim 1 wherein said valve seat includes an annular member and said valve member rests on and partially extends below said annular member.

3. The watering device according to claim 2 wherein said annular member has an outer circumference and an inner circumference, said outer and inner circumferences defining a continuous ring having a top surface, a bottom surface and an edge, and said edge of said ring transitions upward from said top surface at a location between said inner and outer circumferences.

4. The watering device according to claim 3 wherein said valve member is a ball.

5. The watering device according to claim 4 wherein said inner circumference of said valve seat is coined so as to form a depression thereon corresponding to the curvature of said ball.

6. The watering device according to claim 5 wherein said valve assembly comprises:

a generally cylindrical member;

a first opening in one end of said cylindrical member, said first opening comprises said inlet for fluid;

a second opening in the opposite end of said member, said second opening for receiving said ball; and said valve seat press-fit into said second opening, thereby precluding said ball from exiting said valve chamber through said second opening.

7. The watering device according to claim 6 further including means for positively locating said valve seat.

8. The watering device according to claim 7 wherein said means for positively locating said valve seat includes a lip in said cylindrical member to limit advancement of said valve seat into said second opening and to assist proper alignment thereof.

9. The watering device according to claim 8 wherein said housing includes:

a generally cylindrical member;

a first opening in one end of said cylindrical member for matably receiving said valve assembly;

a second opening in the opposite end of said cylindrical member, said second opening comprises said outlet for fluid; and a second seat therein.

10. The watering device according to claim 9 wherein said means for positively locating said valve seat includes a stop in said housing to restrict advancement of said valve assembly into said housing and to assist alignment of said valve seat.

11. The watering device according to claim 10 further including means for actuating said valve member so as to allow fluid to flow from said valve chamber to said outlet.

12. The watering device according to claim 11 wherein said means for actuating said valve member includes an actuator head and a pin portion extending through said outlet for fluid and the portion of said valve member extending below said valve seat rests adjacent said actuator head.

13. The watering device according to claim 12 wherein said actuator head bears on said second seat.

14. A watering device for fowl and small animals comprising:

a housing with an outlet for passing fluid to said fowl and small animals;

a valve chamber with an inlet for receiving fluid;

valve means including seat means and sealing means disposed in said chamber such that said valve means and said chamber form a self-contained valve assembly that mates with said housing as a single unit; and means for actuating said valve means so as to allow fluid to flow from said valve chamber to said outlet.

15. The watering device according to claim 14 further including means attached to said housing for aligning said seat means.

16. The watering device according to claim 15 wherein said seat means forms a lower enclosure of said valve chamber and secures said sealing means therein.

17. A watering device for fowl and small animals, said device comprising a valve chamber, a valve member, a valve seat, a valve actuator, and a housing unit, and assembled by the method of:

inserting said valve member in said valve chamber, press-fitting said valve seat into said valve chamber so as to form a self-contained valve assembly including said valve member, and inserting said valve actuator in said housing unit; and inserting said valve assembly in said housing unit.

18. A watering system for fowl and small animals comprising means for providing fluid to a supply line, means for regulating the fluid pressure in said supply line, means for draining fluid from said supply line, and at least one watering device attached to said supply line for delivering fluid to said fowl and small animals, said at least one device comprising a valve chamber with an inlet for receiving fluid;

a valve member disposed in said chamber for controlling fluid flow therethrough;

a valve seat disposed in said chamber;

a housing with an outlet for passing fluid to said fowl and small animals; and said valve chamber, valve member and valve seat forming a self-contained valve assembly that mates with said housing as a single unit.

* * * * *